United States Patent [19]
Miller

[11] Patent Number: 6,009,484
[45] Date of Patent: Dec. 28, 1999

[54] PRIORITY-BASED I/O TASK PROCESSING IN COMPUTERS

[75] Inventor: Steven M. Miller, Batavia, Ill.

[73] Assignee: NCR Corporation, Dayton, Ohio

[21] Appl. No.: 08/808,329

[22] Filed: Feb. 28, 1997

[51] Int. Cl.$^6$ .............................. G06F 13/14; G06F 13/20
[52] U.S. Cl. .................................... 710/40; 710/2; 710/6; 710/36; 710/39
[58] Field of Search ..................................... 395/822, 826, 395/856, 859, 860; 710/1, 2, 6, 36, 39, 40

[56] References Cited

U.S. PATENT DOCUMENTS

| | | | |
|---|---|---|---|
| 3,421,150 | 1/1969 | Quosig et al. | 340/172.5 |
| 3,810,105 | 5/1974 | England | 340/172.5 |
| 5,155,680 | 10/1992 | Wiedemer | 364/406 |
| 5,301,279 | 4/1994 | Riley et al. | 395/275 |
| 5,367,571 | 11/1994 | Bowen et al. | 380/20 |
| 5,465,354 | 11/1995 | Hirosawa et al. | 395/650 |
| 5,526,521 | 6/1996 | Fitch et al. | 395/650 |
| 5,574,892 | 11/1996 | Christensen | 395/500 |
| 5,613,114 | 3/1997 | Anderson et al. | 395/678 |
| 5,619,647 | 4/1997 | Jardine | 395/200.01 |
| 5,630,128 | 5/1997 | Farrell et al. | 395/673 |
| 5,640,596 | 6/1997 | Takamoto et al. | 395/841 |
| 5,673,415 | 9/1997 | Nguyen et al. | 395/476 |
| 5,729,736 | 3/1998 | Gomi et al. | 395/610 |
| 5,742,756 | 4/1998 | Dillaway et al. | 395/186 |
| 5,745,792 | 4/1998 | Jost | 295/878 |
| 5,822,584 | 10/1998 | Thompson et al. | 395/673 |

OTHER PUBLICATIONS

"Selection Priority Jumper Arrangement", Billian, IDM TDB, vol. 26, No. 12, pp. 6514 and 6515, May, 1984.
"Improved Dispatching in a Rendering Context Manager", IBM TDB n7, pp. 131–134, Dec. 1990.
"SunOS Manpage for SLEEP (3V)", Sun Microsystems, SunOS 4.1.3_U1 Manual pages, Section 3V, Jan. 1990.
"SunOS Manpage for USLEEP(3)", Sun Microsystems, SunOS 4.1.3_U1 Manual pages, Section 3, Oct. 1987.
Solaris Manpage for sleep (3B), Sun Microsystems, Solaris 5.2 Manual pages, sleep section 3B, 1993.
"Standard PC–NET Adapter and Software CSMA or CSMA/CA on Non–traditional Media", IBM TDB n3, pp. 105–108, Aug. 1992.
"3.3.2 Round Robin", Tsichritzis et al, Operating systems, pp. 61–63, 1974.
"Time Slice", Ralston et al, Encyclopedia of Computer Science, pp. 1426 and 1427, Jan. 1976.
"Time Sharing Scheduling Method", IBM TDB, pp. 2996–2999, Mar. 1971.

*Primary Examiner*—Thomas C. Lee
*Assistant Examiner*—Rehana Perveen
*Attorney, Agent, or Firm*—Gregory A. Welte

[57] ABSTRACT

A system for prioritizing Input/Output tasks in a computer. The tasks are assigned ranks. When a task is running on the computer, incoming tasks are placed into a queue, in rank order. If the highest-ranking task within the queue outranks the running task, the running task is suspended, and that highest-ranking task is run instead. When that task finishes running, the next-ranking task is run, and so on.

14 Claims, 9 Drawing Sheets

PRIORITY-BASED I/O TASK PROCESSING IN COMPUTERS

The invention concerns prioritizing Input/Output (I/O) tasks in a computer, and allowing the I/O having the highest priority to proceed, while suspending, or blocking, other I/O tasks.

BACKGROUND OF THE INVENTION

Modern computers are frequently equipped with multiple peripheral devices with which the computers communicate. These devices include, for example, printers and plotters;
 communication devices, such as telephone modems and video conferencing expansion cards;
 pointing devices such as digitizing pads and mouses; and
 storage media, such as disc drives and tape drives.

Many computers are based on a single-bus architecture. One example is the so-called "personal computer," which was developed by IBM Corporation, Armonk, N.Y., and which is designed around the 8XX86 series of microprocessors manufactured by INTEL Corporation, Santa Clara, Calif. The single bus is used for communication between the computer's microprocessor and the devices described above.

However, the single bus can sometimes act as a bottleneck, since only a single agent at any time can use the bus for communication. For example, during a printing task the bus is occupied, because the microprocessor sends the data to a printer, using the single bus. An incoming message, as from a telephone modem, will generally be blocked from the bus, and must wait for release of the bus by the processor. Further, the blockage can occur, no matter how important the incoming message may be, relative to that of the printing task.

OBJECTS OF THE INVENTION

It is an object of the invention to provide an improved system for allocating I/O tasks in a computer.

It is a further object of the invention to allocate I/O tasks, in order to minimize disruption of the tasks presently performed by other components in the computer.

SUMMARY OF THE INVENTION

In one form of the invention, I/O tasks are assigned priorities, as by a numerical ranking. The I/O tasks are processed in rank order.

DETAILED DESCRIPTION OF THE INVENTION

Assigning Rank to Expansion Cards

Figure 1:
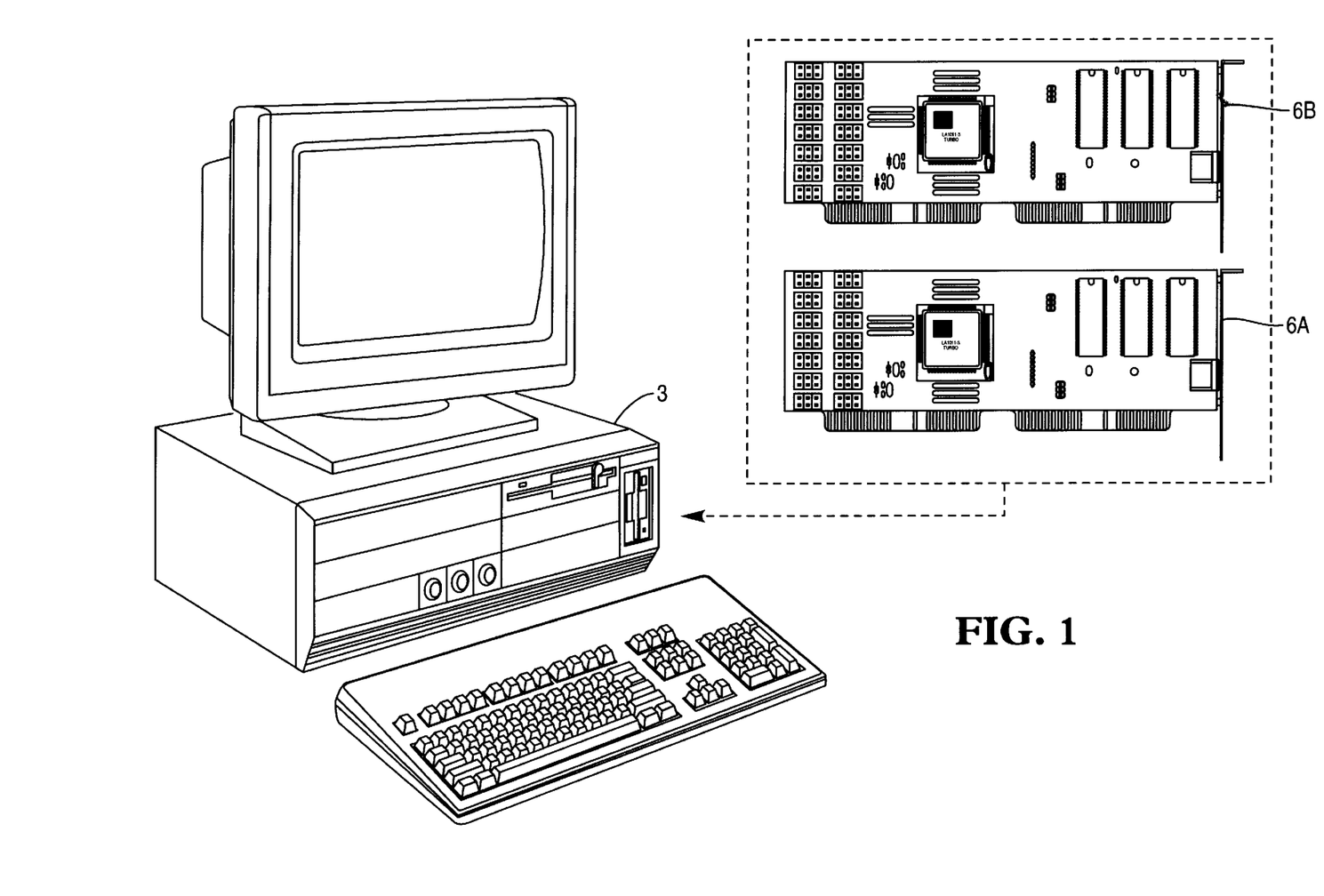
FIG. 1 illustrates expansion cards used by a microcomputer.

I/O operations are commonly handled by "expansion cards," which are commercially available accessories sold for use with the personal computer. FIG. 1 illustrates such a computer 3 and two expansion cards 6A and 6B.

Card 6A may, for example, control a mass storage device, such as a fixed disc drive, or tape drive (neither shown). Card 6B may, for example, interface with an ISDN telephone channel (not shown). (ISDN is an acronym for Integrated Services Digital Network.)

Figure 2:
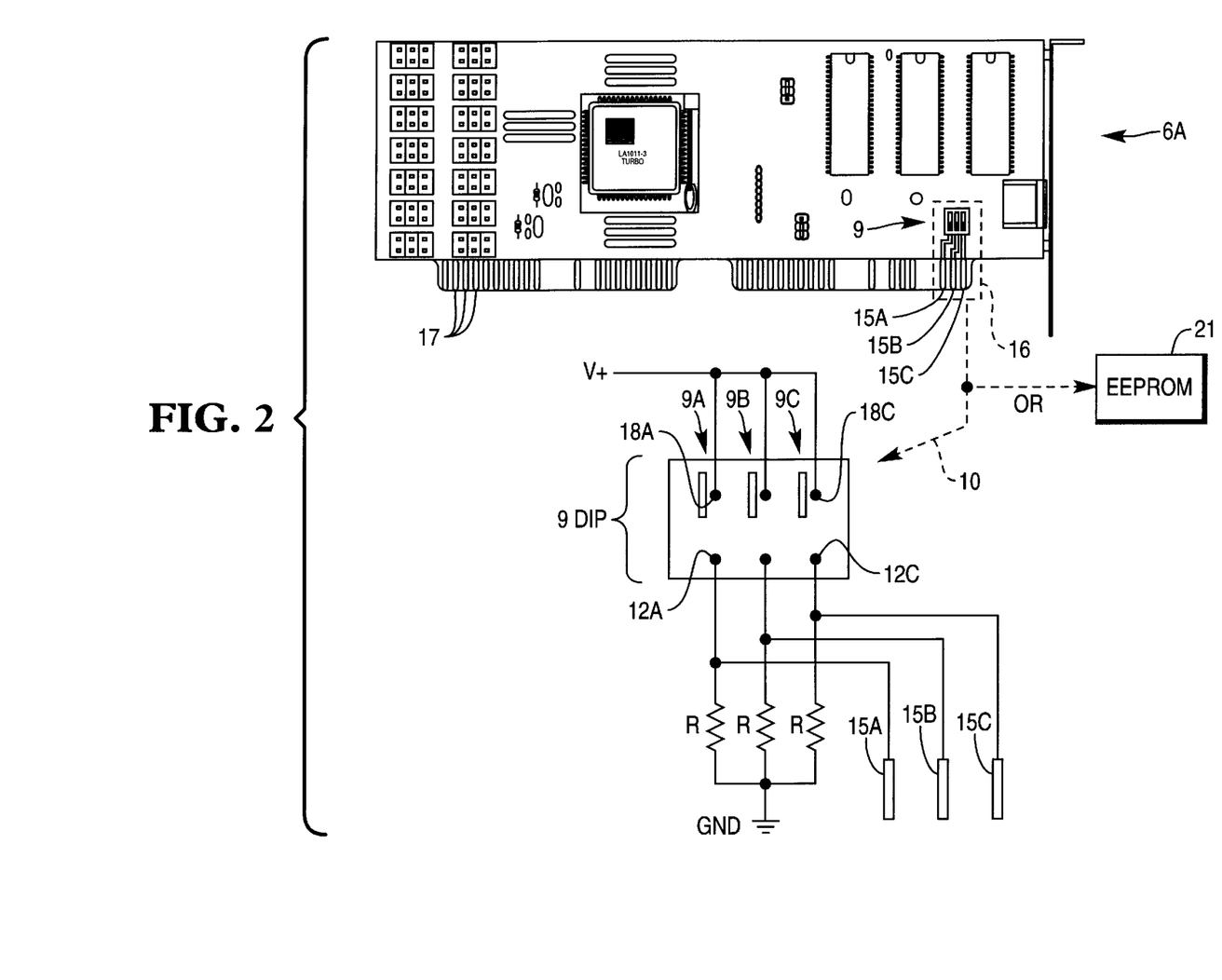
FIG. 2 illustrates apparatus for assigning a priority to each expansion card.

The invention assigns a rank to each I/O card, as by using a DIP switch 9 in FIG. 2. The DIP switch 9 shown contains three individual switches, 9A, 9B, and 9C, as indicated in the insert to which dashed arrow 10 points. Terminals 18 of the DIP switch 9 are connected to a high voltage, such as 5 volts, indicated by V+.

Terminals 12A–12C of the switches are connected to resistors R, which lead to ground, as indicated by the ground symbol GND. These terminals 12A–12C are also connected to respective card-edge connectors 15A–15C, which are also labeled on the card 6A, within dashed box 16. These edge-card connectors are part of the standard array of edge-card connectors, indicated generally as 17, which connect with the system bus (not shown) of the computer 3 in FIG. 1, when the expansion card 6A is installed.

With this arrangement, when an individual switch, such as 9A, is open, its card-edge connector 15A is connected to ground, and thus produces a logic ZERO signal. When this switch 9A is closed, its card-edge connector 15A becomes connected to V+, thereby producing a logic HIGH signal. Thus, by selectively positioning the switches 9A, 9B, and 9C, one may assign a number to the card, which ranges from binary 000 through 111, in this example. This number is the card's rank.

A significant feature of the DIP switches 9 can be appreciated by reference to DIP switches which exist on prior-art expansion cards. These prior-art DIP switches are used to assign an address to the card. That is, the prior-art expansion card is connected to an address bus, and the DIP switches program a decoder to respond when the assigned address is placed on the bus, and to ignore other addresses. The DIP switches 9 of the invention do not do this. They do not program a decoder, and they cause nothing to respond to an address placed on an address bus.

Other approaches can be taken to assigning a rank to the card 6A. For example, an Electrically Erasable Programmable Read-Only Memory (EEPROM) 21 can be provided, which is connected to the edge-card connectors 15, allowing the EEPROM 21 to be read, programmed, and erased by the microprocessor (not shown) of the computer 3 in FIG. 1.

Running Tasks According to Rank

Once a rank is assigned to each expansion card, the invention may undertake its operation. In a simplified sense, the invention performs the tasks indicated by the following pseudo-code:

Pseudo-Code

1. When an I/O task is requested, examine its rank, and place it into a queue, according to rank.
2. Compare the rank of all tasks: that which is running and those in the queue.
   a) If the highest-ranked task is running, allow it to continue.

b) If a task in the queue out-ranks a running task, stop the running task, and replace it with the higher-ranked task standing in the queue.

c) If no task is presently running, select highest-ranked task in the queue to run.

3. When a running task terminates, select the highest-ranked task in the queue to run.

4. Return to step 1.

The programming which implements this pseudo-code cycles continually through steps 1 through 4 With this arrangement, at any given time, the highest-ranked I/O task will be run, and that highest-ranked task can interrupt the running of a lower-ranked task.

As a specific example, assume a tape drive ranked as 000 (the lowest), and an ISDN expansion card ranked as 111 (the highest). If the computer is backing up data to the tape drive when an ISDN telephone call arrives, the computer suspends the back-up, and accepts the ISDN call.

Figure 3:
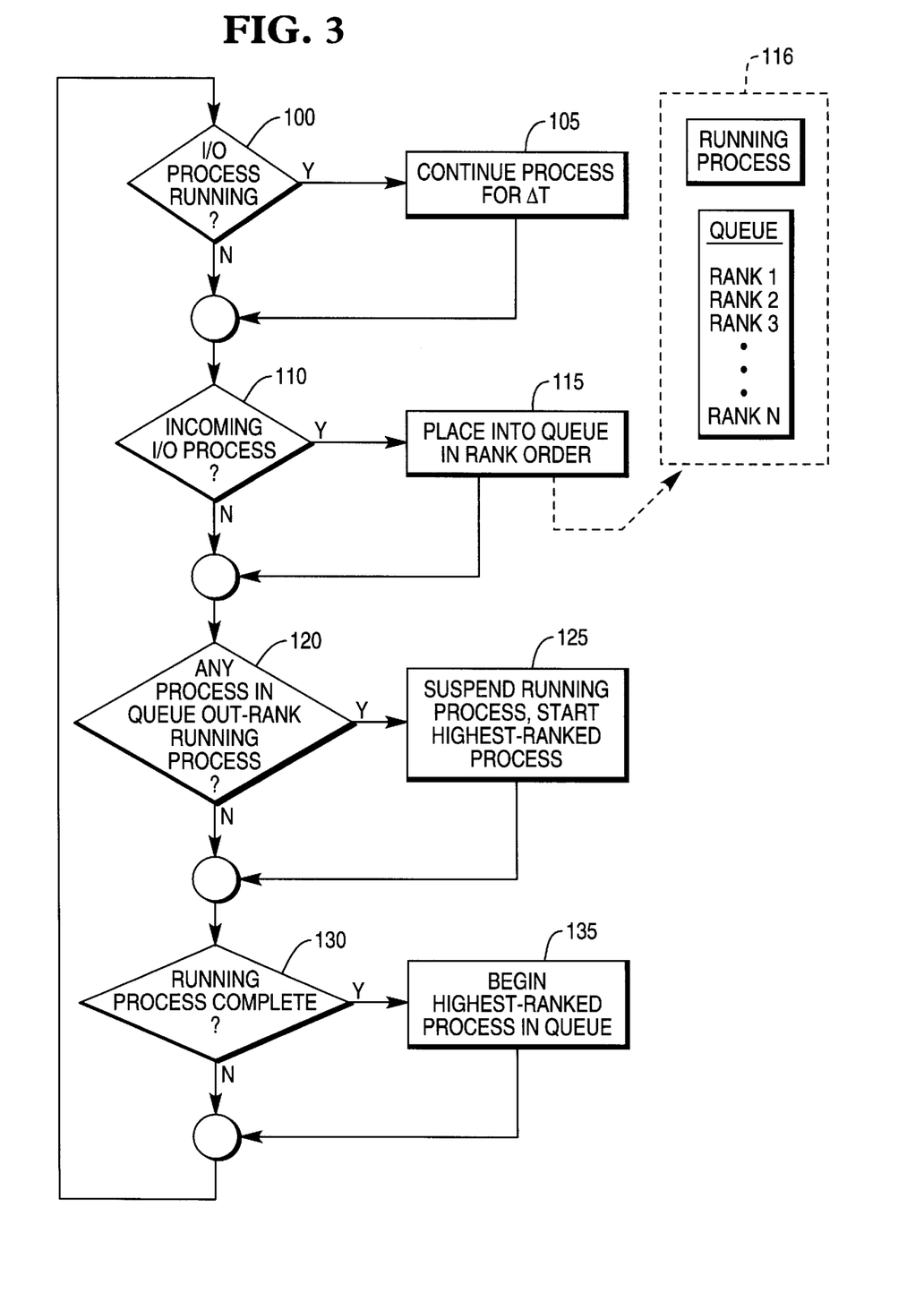
FIGS. 3, 4, 5, and 9 are flow charts illustrating logic implemented by one form of the invention.

Flow Chart of FIG. 3

FIG. 3 is a flow chart illustrating, in greater detail, the logic described by the pseudo-code given above. Block 100 inquires whether an I/O process, such as the tape back-up described above, is running. If so, block 105 indicates that the running process continues for a time interval DELTA-T. This time interval is sufficient to accomplish a significant part of the task, yet is short enough to allow periodic checking for whether higher-ranked tasks should be allowed to displace the running task. Block 120, later described, indicates such checking.

After DELTA-T expires, block 110 checks to see whether an incoming I/O process exists. If so, block 115 places the incoming process into a queue, in rank order. Dashed block 116 illustrates the co-existence of the running process, and those in the queue. As an example, if the incoming process is the ISDN telephone call identified above, then it will be placed first in the queue (assuming that no other I/O processes of rank binary 111 have arrived earlier).

Next, block 120 inquires whether any process held in the queue out-ranks the running process. If so, then block 125 suspends the running process, and runs the higher-ranking process standing in the queue. If not, block 130 is reached, which inquires whether the running process has completed. If so, block 135 indicates that the highest-ranked process in the queue is then run, and the logic returns to block 100, which repeats the process.

Thus, at any given time, the highest-ranked process is always run, and that process displaces any lower-ranked running process. Of course, this rule is subject to a common-sense interpretation. That is, for example, a low-ranking process may be running when a higher-ranking process arrives. At the precise time of arrival, the rule is temporarily violated, because the low-ranking process will continue to run for a short time, until the higher-ranking process is identified and launched. However, these events simply illustrate computation delays inherent in identifying the higher-ranking process, and to get it running.

It should be recognized that the queue is a tangible entity, and, in one form, is a device by which the positions of tasks, within the queue, can be assigned, and recognized. The "tasks," in many cases, are represented by data waiting to be processed.

Figure 4:
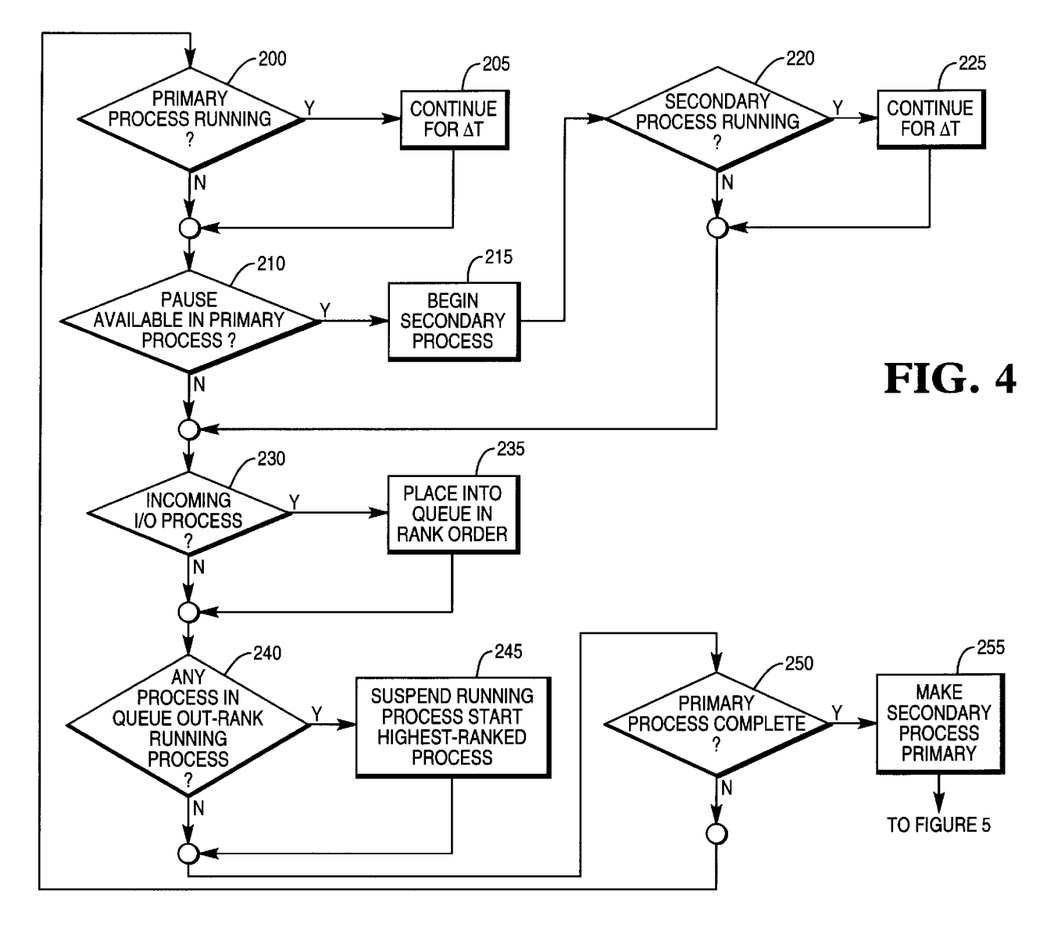
Figure 5:
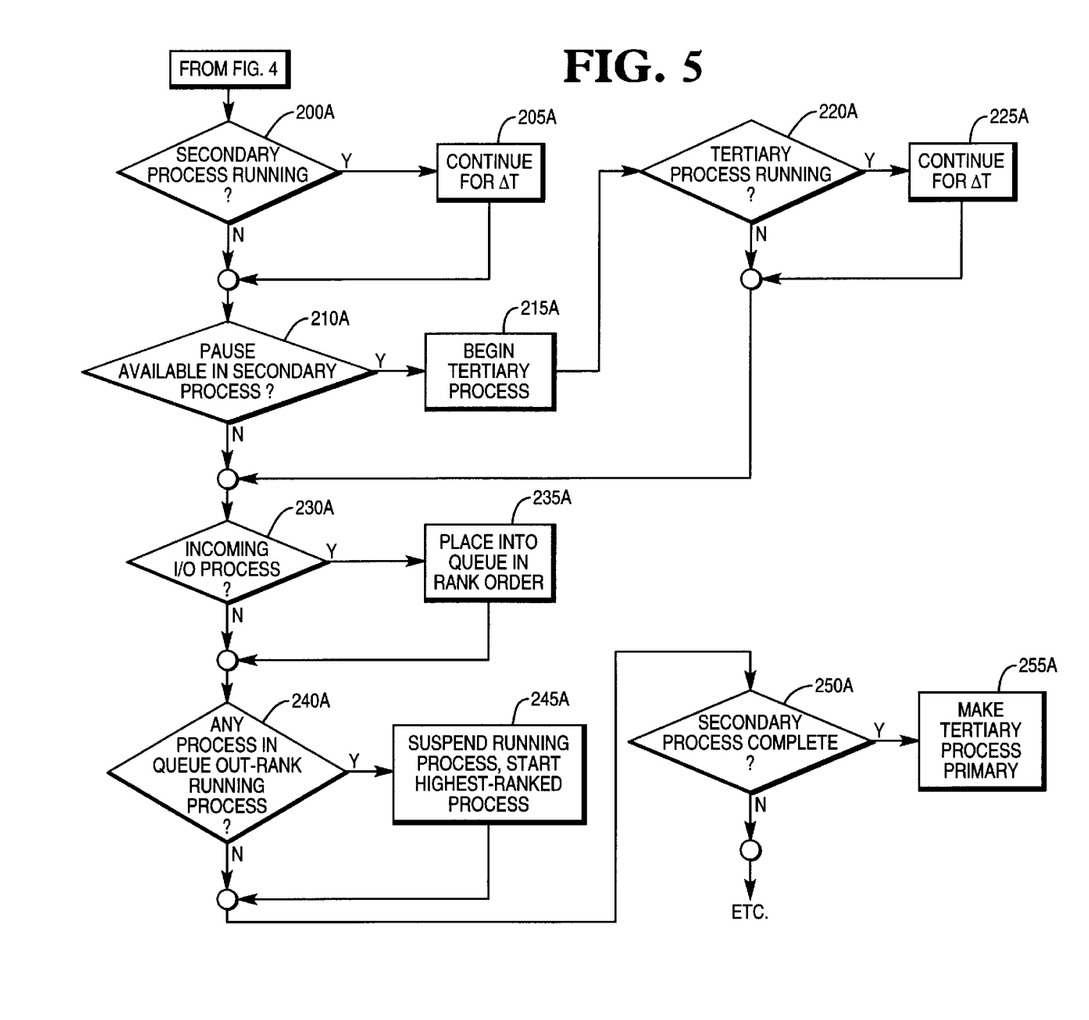

Flow Chart of FIGS. 4 and 5

The preceding discussion indicated that, at any given time, subject to switch-over delays, the highest-ranked I/O process runs. However, it is possible that the highest-ranked process will not fully occupy the entire capabilities of the computer. As a simple example, the highest-ranked I/O process may involve video conferencing, using ISDN telephone lines, wherein a video image is produced in a window on a computer display. Assume that the frame rate of the video image is 10 frames per second, meaning that the image contained in the window changes every 1/10 second.

It is possible that the ISDN card 6B in FIG. 1 can handle each frame in far less time than the required 1/10 second. As a specific hypothetical example, assume that the ISDN card 6B can handle one frame in 1/100 (i.e., 0.01) second. Since a new frame must be handled every 1/10 (i.e., 0.10) second, and since the ISDN card can handle that frame in the stated shorter time of 1/100 (i.e., 0.01) second, then, for each frame, the ISDN card stands idle for 0.09 second. But even though the ISDN card is idle ninety percent of the time, other I/O tasks are blocked, so long as the ISDN card has highest priority.

This idleness can be explained from another perspective. ISDN lines are commonly supplied in pairs, and a common type of pair can carry 128 Kilo-bits per second, corresponding to 16 Kilo-bytes per second (128/8=16). Also, the data for the frames described above is commonly stored in a "frame buffer" (also called video RAM).

If one assumes (1) a clock rate in the computer's microprocessor of 100 Mega-Hertz (MHz), and (2) that a.single byte can be received from the card 6B and loaded into a video frame buffer in ten clock cycles, then one can conclude that the computer can handle 10 Mega-bytes per second. Thus, the capacity of the computer to transfer data into the frame buffer far exceeds the capacity of the ISDN lines to deliver it. The computer will stand idle during certain periods of the video conference.

To prevent this idleness, the invention inter-leaves other I/O tasks with the highest-ranked task, if possible. In effect, the I/O processes are (1) broken into individual sub-tasks, and (2) the sub-tasks are time-multiplexed. FIGS. 4 and 5 contain a flow chart illustrating this time-multiplexing. The following pseudo-code represents steps to take for implementation of the time-multiplexing.

Pseudo-Code

1. When an I/O task is requested, examine its rank, and place it into a queue, according to rank.

2. Compare the rank of all tasks: that which is running and those in the queue.

a) If the highest-ranked task is running, allow it to continue.

b) If a task in the queue out-ranks a running task, stop the running task, and replaced it with the higher-ranked task standing in the queue.

c) If no task is presently running, select the highest-ranked task in the queue to run.

3. When a running task terminates, select the highest-ranked task in the queue to run.

4. When a running task pauses, select the highest-ranked task in the queue to run during the pause.

5. Return to step 1.

FIGS. 4 and 5 illustrate flow charts implementing this pseudo code. In FIG. 4, block 200 inquires whether a primary process is running. If so, the process continues for a time DELTA-T, indicated by block 205. After DELTA-T expires, block 210 inquires whether a pause is available in the primary process. As an example of an available pause, in a video conference, completion of loading of one frame's worth of data into the computer's frame buffer may allow a pause, until the next frame of data arrives. As another example, in a printing process, completion of transfer of one page of data to a printer may allow a pause, because no further printing can occur, until the printer physically prints and delivers the current page.

If a pause is available, block 215 indicates that a secondary process will begin. This secondary process will be taken from the queue 116, indicated in FIG. 3, and will be the highest-ranked process standing in the queue.

Block 220 inquires whether the secondary process is running. This inquiry is similar to that of block 200. If so, block 225 continues that process for DELTA-T (which may, or may not, be the same length of time as the DELTA-T in block 205). This DELTA-T is designed to be shorter than the allowable pause, so that the primary process can be resumed on time, allowing for processing of the remaining steps in FIG. 4.

After DELTA-T expires, block 230 is reached, which inquires whether an incoming I/O process exists. If so, block 235 places that process into the queue, in rank order.

Next, block 240 inquires whether any process in the queue out-ranks the running process, as may occur when block 235 adds an incoming process to the queue. If a process in the queue out-ranks the running process, block 245 suspends the running process, and replaces it with the higher-ranking process.

Block 250 inquires whether the primary process is complete. If not, the logic returns to block 200, and repeats. If so, block 255 makes the highest-ranking process in the queue the primary process. In this case, that process will be the secondary process. The secondary process may be that of block 220, or may be the original primary process, if (1) that process was suspended in block 245 and (2) after suspension, that process is the highest-ranking process, which is expected to be the case most of the time.

The logic then proceeds to FIG. 5, which repeats many of the logic steps of FIG. 4. Those steps are designated by an "A" following the call-out identifying a step in FIG. 4, such as step 200A in FIG. 5, which corresponds to step 200 in FIG. 4.

In FIG. 5, block 200A inquires whether a secondary process is running. If so, the process continues for a time DELTA-T, indicated by block 205A. After DELTA-T expires, block 210A inquires whether a pause is available in the secondary process.

If a pause is available, block 215A indicates that a tertiary process will begin. This tertiary process will be taken from the queue 116, indicated in FIG. 3, and will be the highest-ranked process standing in the queue.

Block 220A inquires whether the tertiary process is running. This inquiry is similar to that of block 200A. If so, block 225A continues that process for DELTA-T (which may, or may not, be the same length of time as the DELTA-T in block 205A).

After DELTA-T expires, block 230A is reached, which inquires whether an incoming I/O process exists. If so, block 235A places that process into the queue, in rank order.

Next, block 240A inquires whether any process in the queue out-ranks the running process, as may occur when block 235A adds an incoming process to the queue. If a process in the queue out-ranks the running process, block 245A suspends the running process, and replaces it with the higher-ranking process.

Block 250A inquires whether the secondary process is complete. If not, the logic returns to block 200A, and repeats. If so, block 255A makes the highest-ranking process in the queue the primary process. These steps continue, as indicated by the symbol "etc." below block 250A, which returns the logic to block 200A. If quaternary, and additional, processes are desirable, then the logic branches from block 255A, in a manner similar to the branching from block 255.

Implementation of Pauses

One Approach

Figure 6:
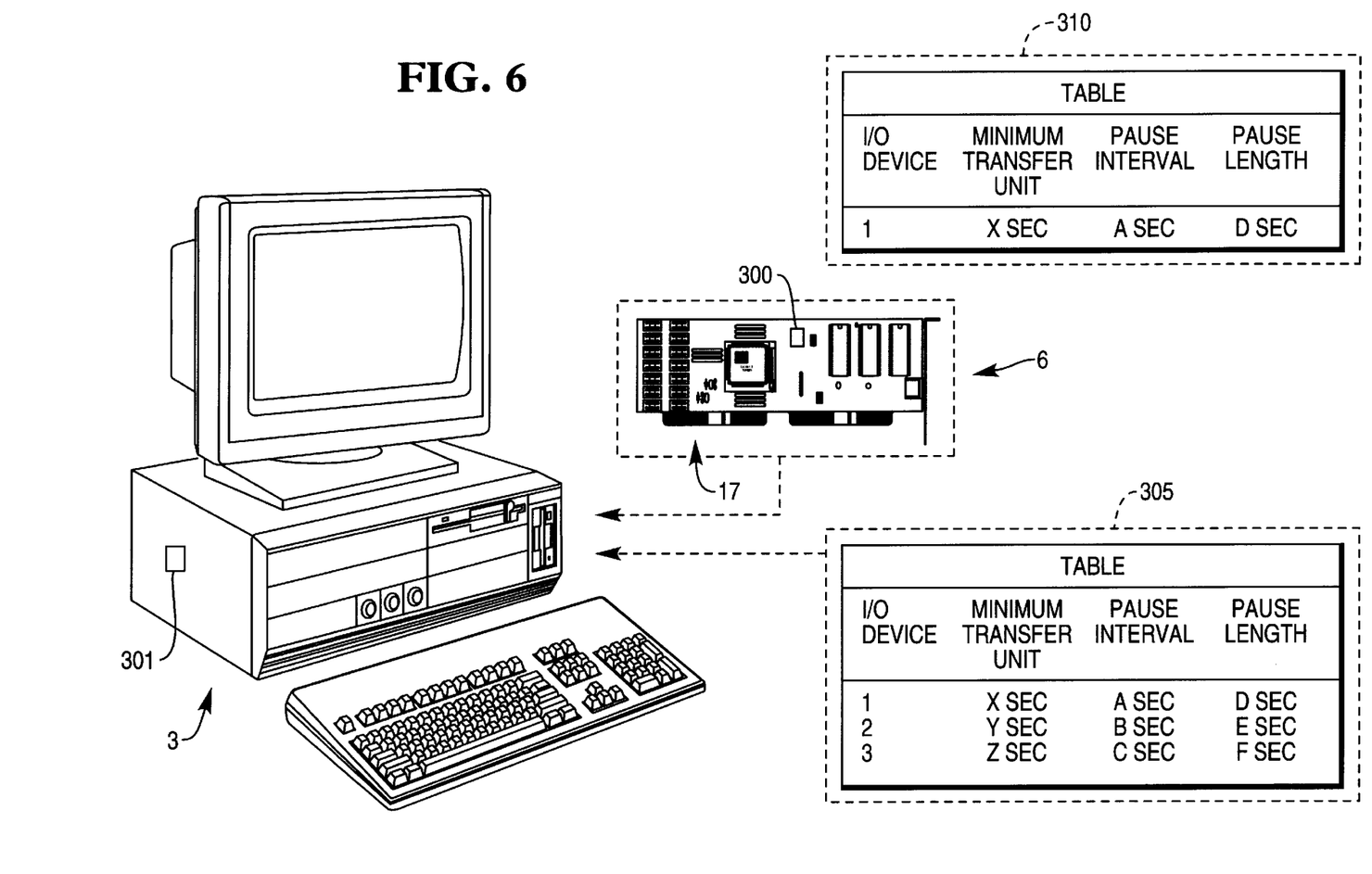
FIG. 6 illustrates storage of timing parameters relevant to multiplexing of I/O tasks.
Figure 7:
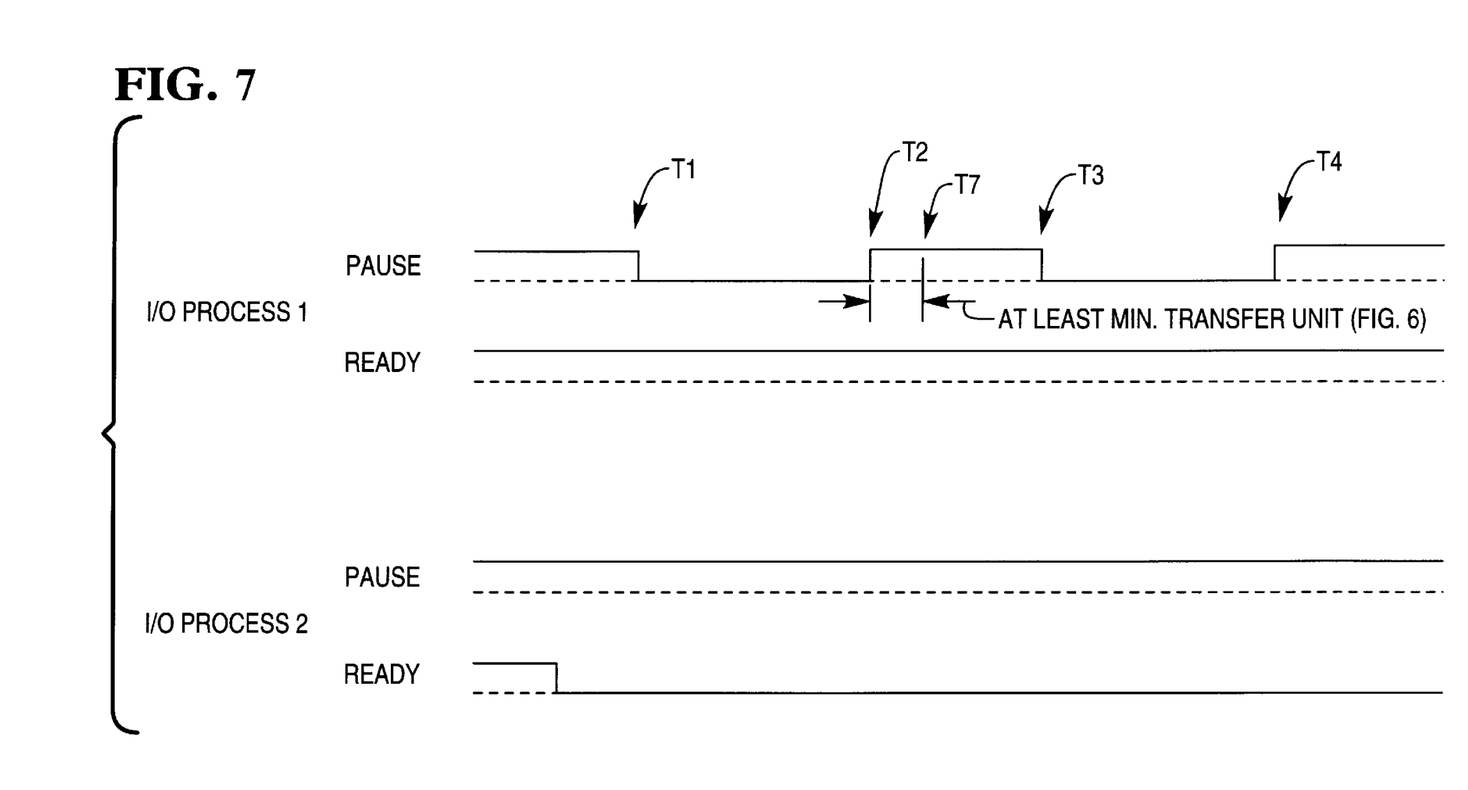
FIGS. 7 and 8 illustrate timing diagrams of PAUSE and READY signals.

The expansion card 6 in FIG. 6 may contain logic which applies signals to signal lines 17 (also shown in FIG. 2), which indicate when pauses are appropriate. FIG. 7 provides a simple example.

In FIG. 7, each I/O process, or card 6, is assigned two lines 17 (shown in FIG. 1), namely, a PAUSE line and a READY line, indicated in FIG. 7. Assume that I/O PROCESS 1 is the running process. When PROCESS 1 reaches a time when a pause is allowed, PROCESS 1 pulls the PAUSE line LOW, as indicated at time T1. A program 301 in FIG. 6 within the computer 3 looks for this event, and, when it occurs, the program searches for another PROCESS which has issued a READY signal. In this search, the program will find that PROCESS 2 has issued a READY signal. The program allows PROCESS 2 to execute I/O, until the program detects that PROCESS 1 has withdrawn the PAUSE signal, which occurs at time T2. PROCESS 1 times the issuance of the withdrawal of the PAUSE signal so that sufficient time is available for the other process, PROCESS 2, to finish its block of I/O.

A predetermined time after the withdrawal occurring at time T2, PROCESS 1 resumes its execution of I/O, and the overall sequence described above repeats.

Figure 8:
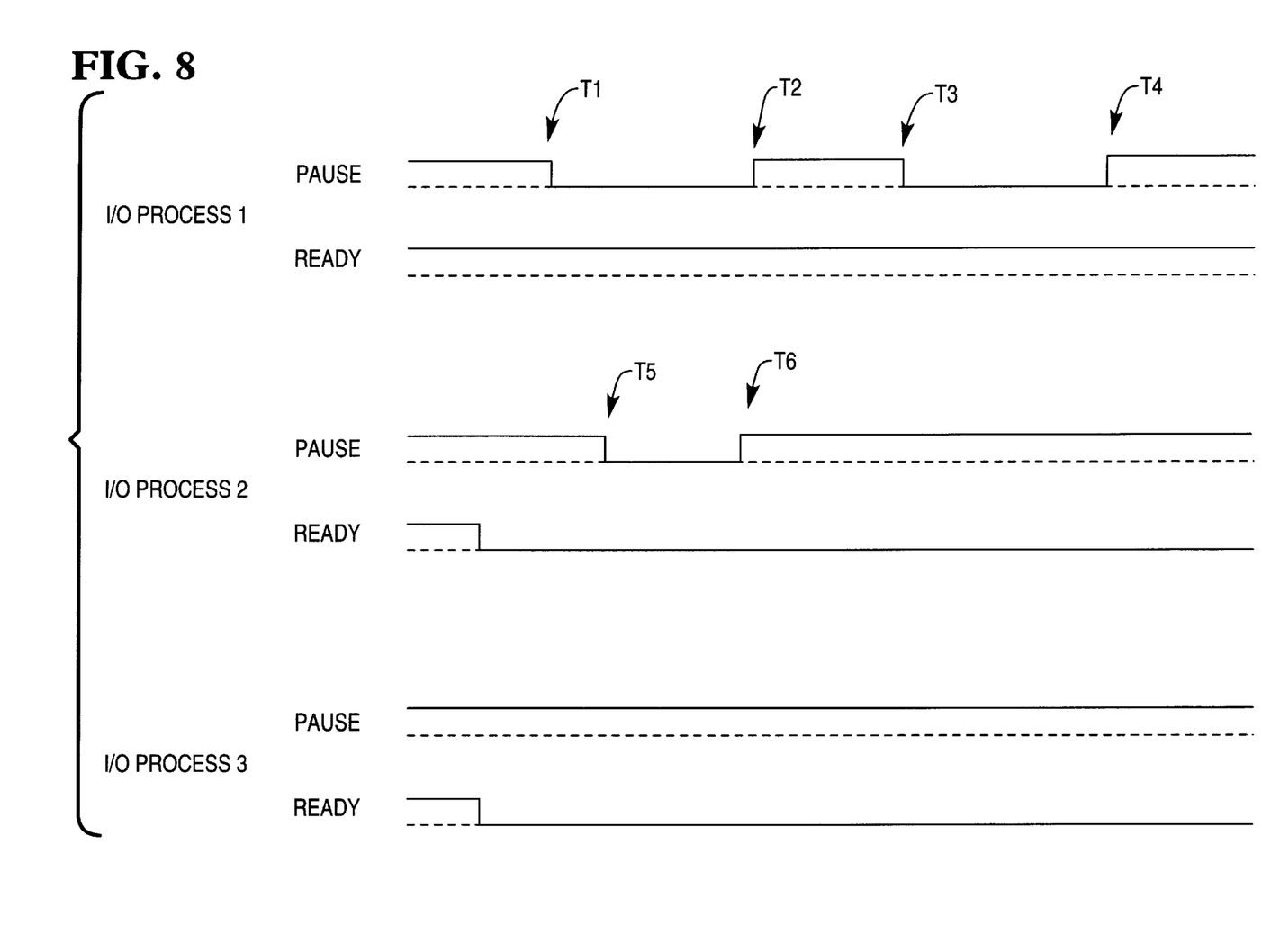

It may occur that PROCESS 2 issues its own PAUSE signal, as shown in FIG. 8. In that case, the program looks for a third PROCESS which has issued a READY signal. In this case, PROCESS 3 is identified, and is allowed to execute its own I/O When PROCESS 2 withdraws its PAUSE signal, at time T6, PROCESS 3 is ordered to terminate, and PROCESS 1 resumes, at, or near, time T2. Thus, both PROCESSes 2 and 3 execute I/O during the pause taken by PROCESS 1.

Second Approach

The expansion card 6 of FIG. 6 need not contain the logic circuitry 300. Instead, a table 305 may be provided which contains information necessary for interleaving the I/O PROCESSes of FIG. 8. The TABLE 305 stores three different units of time for each I/O DEVICE, or process.

MINIMUM TRANSFER UNIT refers to the length of time which each DEVICE requires for transfer of its normal unit of data, such as 128 bytes. This time is used to compute how much advance notice must be given to a process currently executing part of an I/O task, in order to allow that process to finish the part. For example, the withdrawal of the PAUSE signal by PROCESS 1, at time T2 in FIG. 7, must give PROCESS 2 sufficient time to complete its I/O, before PROCESS 1 resumes its I/O execution. The resumption occurs at time T7. The advance notice must be at least the difference between T2 and T7, as indicated by the label "AT LEAST MIN TRANSFER UNIT (FIG. 6)."

In TABLE 305 a PAUSE INTERVAL is also indicated. That refers, for example, to the time interval between T2 and T3 in FIG. 7. A PAUSE LENGTH is also indicated, which refers, for example, to the time interval between T1 and T2.

Third Approach

A common TABLE 305 is not necessary. Each expansion card 6 may contain the table entries relevant to the respective card, as indicated by TABLE 310. The tables are read through the signal lines 17.

Logic Implementing Pauses

Figure 9:
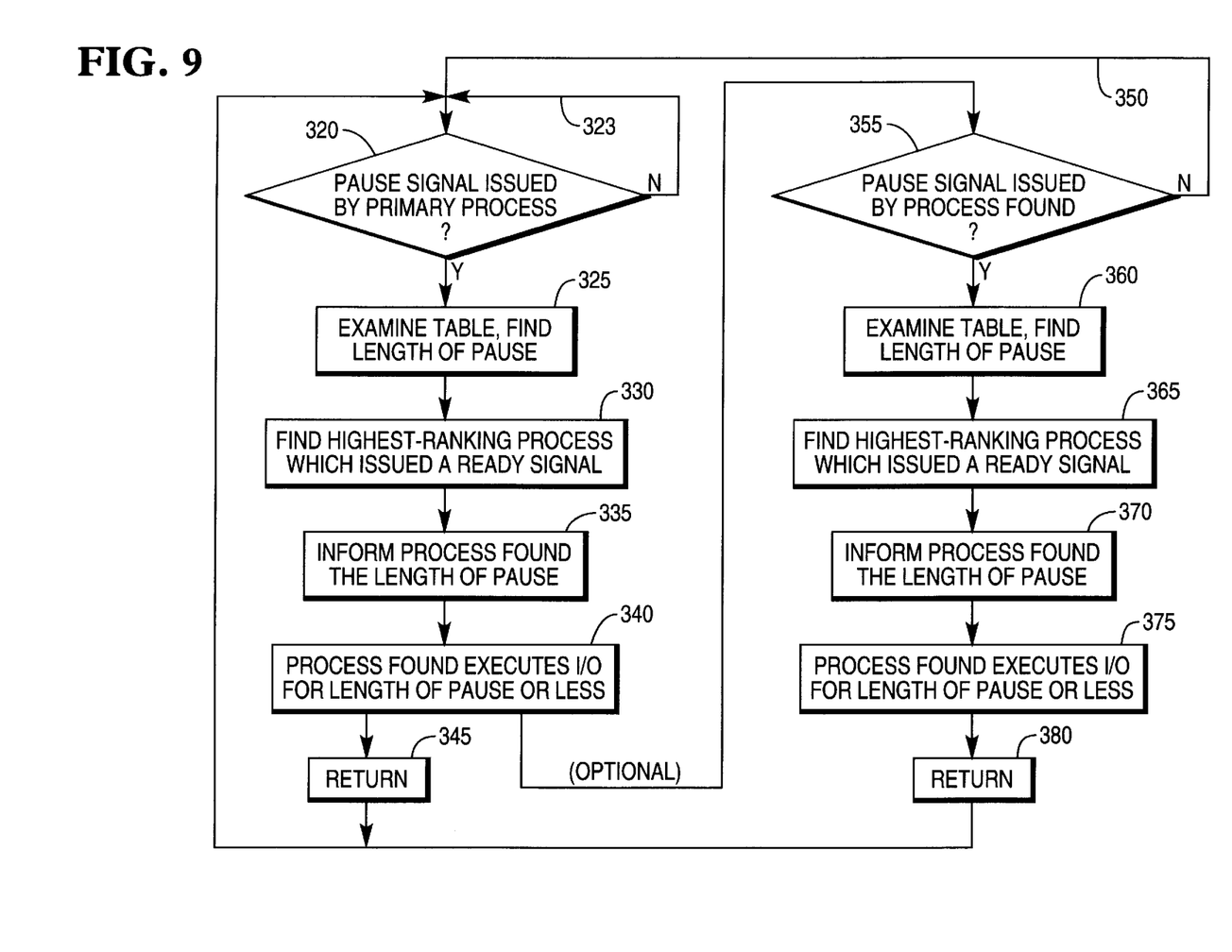

As FIG. 9 indicates, block 320 inquires whether a PAUSE signal is issued by a primary process. If not, the logic idles in loop 323. If so, block 325 examines TABLE 305 in FIG. 6 to determine how long the PAUSE will last. (Alternately, the logic can (1) examine the other sources, shown in FIG. 6, which indicates PAUSE duration, or (2) wait for the withdrawal of the PAUSE signal, as described above.)

Block 330 in FIG. 9 searches for the highest-ranking process which issued a READY signal. FIG. 7 illustrates READY signals. Block 335 in FIG. 9 indicates that the logic informs the process found how long the PAUSE will last, and, as block 340 indicates, the process executes its I/O for that length of time, or less. Block 345 returns execution of I/O to the primary process.

As explained in connection with FIG. 8, the process taking advantage of the PAUSE may itself issue a PAUSE signal. In this case, the OPTIONAL path is taken from block 240.

Block 355 inquires whether a PAUSE signal was issued by the process found in block 325. If not, branch 350 returns the logic to block 320. If so, block 360 examines TABLE 305 in FIG. 6 to determine how long the PAUSE will last.

Block 365 in FIG. 9 searches for the highest-ranking process which issued a READY signal. Block 370 indicates that the logic informs the process found how long the PAUSE will last, and, as block 375 indicates, the process found executes its I/O for that length of time, or less. Then, as indicated by block 380, the logic returns execution of I/O to the primary process.

Of course, the process found in block 365 may issue its own PAUSE signal, in which case yet another path, analogous to the OPTIONAL path leading from block 340, is taken, and so on.

Numerous substitutions and modifications can be undertaken without departing from the true spirit and scope of the invention. What is desired to be secured by Letters Patent is the invention as defined in the following claims.

What is claimed is:

1. Apparatus for use within a computer, comprising:
   a) an expansion card which includes connectors for connecting to one or more busses in the computer; and
   b) memory, comprising one or more switches which can be set by a user, for storing a code within the expansion card, which can be read from a group of the connectors and which is usable by the computer to rank the expansion card in comparison with other apparatus within the computer and thereby enable the computer to actuate the expansion card and other apparatus in a sequence determined by the ranks.

2. Apparatus according to claim 1, wherein the memory comprises a device into which the code can be written by a microprocessor contained within the computer.

3. Apparatus according to claim 2, wherein the memory is of the Electrically Erasable Programmable Read-Only (EEPROM) type.

4. In an expansion card for a computer, which card performs Input/Output (I/O) operations, the improvement comprising:
   a) means for detecting when a pause in an I/O operation is allowed; and
   b) means for issuing a signal indicating that said pause is occurring.

5. In a computer, the improvement comprising:
   a) circuitry which performs Input/Output (I/O) operations; and
   b) memory for storing data concerning parameters of said I/O operations, said parameters including:
      i) MINIMUM TRANSFER UNITs, which refer to the lengths of time required by respective I/O devices to transfer their normal unit of data.

6. Improvement according to claim 5, in which I/O operations pause during their execution, and in which said parameters include one or both of the following:
   1) duration of pauses; and
   2) frequency of pauses.

7. A method of operating a computer, comprising the following steps:
   a) selectively assigning ranks to Input/Output (I/O) processes such that
      i) processes of one type, such as a READ process, are able to be assigned different ranks,
      ii) the ranks of all processes can be changed at any time; and
   b) suspending an I/O process when a process of higher rank is requested.

8. Method according to claim 7, and further comprising the step of
   c) running the process of higher rank when the I/O process is suspended.

9. In the operation of a computer, the improvement comprising the following steps:
   a) for each of several I/O processes, maintaining a PAUSE line and a READY line;
   b) executing suspension of a running Input/Output (I/O) process A and issuing a signal on the PAUSE line corresponding to that process;
   c) during said suspension, identifying an I/O process B which has issued a READY signal and running part of that I/O process B; and
   d) terminating said suspension when withdrawal of the signal on the PAUSE line by process A is detected.

10. A method of operating a computer, comprising the following sequence of steps:

a) maintaining a list which ranks Input/Output (I/O) tasks in order of importance;

b) for each I/O task, storing a parameter which indicates a pause interval which is to be imposed on the task;

c) for a first Input/Output (I/O) task, ascertaining its pause interval A;

d) running part of the first I/O task;

e) suspending the first I/O task for the pause interval A;

f) for a second I/O task, ascertaining its pause interval B;

g) running part of the second I/O task during pause A;

h) suspending the second I/O task for the pause interval B;

i) for a third I/O task, ascertaining its pause interval C;

j) running part of the third I/O task during pause interval B; and k) suspending the third I/O task for the pause interval C, wherein, during pause interval C, the second I/O task is paused during its pause interval B and the first I/O task is paused during its pause interval A.

11. Improvement according to claim 4, wherein the pause is not caused by pre-emption by another operation.

12. Improvement according to claim 4, wherein pauses occur only after predetermined sequences of operations have completed.

13. Improvement according to claim 4, wherein pauses occur only after predetermined units of data have been transferred.

14. Improvement according to claim 4, wherein the two means of paragraphs (a) and (b) are removed from the computer when the expansion card is removed.

* * * * *